US010037472B1

(12) United States Patent
Chen et al.

(10) Patent No.: US 10,037,472 B1
(45) Date of Patent: Jul. 31, 2018

(54) AUTOMATED VEHICLE OBJECT DETECTION SYSTEM WITH CAMERA IMAGE AND RADAR DATA FUSION

(71) Applicant: Delphi Technologies, Inc., Troy, MI (US)

(72) Inventors: Susan Chen, Los Angeles, CA (US); David A. Schwartz, Moorpark, CA (US); Anuradha Mangalgiri, Agoura Hills, CA (US); Yu Liu, Newbury Park, CA (US); Jan Siegemund, Cologne (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/465,296

(22) Filed: Mar. 21, 2017

(51) Int. Cl.
*G06K 9/00* (2006.01)
*G06K 9/62* (2006.01)
*G05D 1/00* (2006.01)
*B60Q 9/00* (2006.01)
*G08G 1/16* (2006.01)

(52) U.S. Cl.
CPC ..... *G06K 9/00805* (2013.01); *G06K 9/00798* (2013.01); *G06K 9/6215* (2013.01); *G06K 9/6288* (2013.01); *B60Q 9/008* (2013.01); *G05D 1/0088* (2013.01); *G08G 1/166* (2013.01)

(58) Field of Classification Search
None
See application file for complete search history.

*Primary Examiner* — Stephen Coleman
(74) *Attorney, Agent, or Firm* — Lawrence D. Hazelton

(57) ABSTRACT

An object detection system for an automated vehicle includes a radar, a camera, and a controller. The radar detects a cluster of targets characterized by a radar-distance (x) from the host-vehicle. The camera renders an image of an object and a lane-marking present in the area. The controller is configured to determine an equation that is a function of a longitudinal-distance from the host-vehicle and corresponds to the lane-marking, determine a first-optical-angle ($\theta$) based on a first-image-distance between a reference-point on the object and a spot on the image indicated by the equation where the longitudinal-distance is equal to the radar-distance, determine a lateral-distance (Dist_LM) between the object and the lane-marking based on the first-optical-angle and the radar-distance, and determine a first-lateral-offset ($y_{RM}$) between the object and a longitudinal-axis of the host-vehicle based on the lateral-distance and a first-value of the equation where the longitudinal-distance is equal to the radar-distance.

8 Claims, 3 Drawing Sheets

AUTOMATED VEHICLE OBJECT DETECTION SYSTEM WITH CAMERA IMAGE AND RADAR DATA FUSION

TECHNICAL FIELD OF INVENTION

This disclosure generally relates to an object detection system for an automated vehicle, and more particularly relates to a system that determines a lateral-offset between an object, e.g. another-vehicle, and a longitudinal-axis of a host-vehicle based on an equation that describes a lane-marking adjacent to the host-vehicle and the other-vehicle.

BACKGROUND OF INVENTION

It is desirable for an automated host-vehicle to determine a lateral-displacement of an other-vehicle traveling forward of the host-vehicle and relative to a longitudinal-axis of the host-vehicle. However, this can lead to undesirable errors if the roadway being traveled is curved.

SUMMARY OF THE INVENTION

In accordance with one embodiment, an object detection system for an automated vehicle is provided. The system includes a radar, a camera, and a controller. The radar detects targets in an area proximate to a host-vehicle. A cluster of targets is characterized by a radar-distance (x) from the host-vehicle. The camera renders an image of an object and a lane-marking present in the area. The controller is in communication with the radar and the camera. The controller is configured to determine an equation that is a function of a longitudinal-distance from the host-vehicle and corresponds to the lane-marking in the image, determine a first-optical-angle (θ) based on a first-image-distance on the image between a reference-point on the object and a spot on the image indicated by a first-value of the equation where the longitudinal-distance is equal to the radar-distance, determine a lateral-distance (Dist_LM) between the object and the lane-marking based on the first-optical-angle and the radar-distance, and determine a first-lateral-offset ($y_{RM}$) between the object and a longitudinal-axis of the host-vehicle based on the lateral-distance and the first-value.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
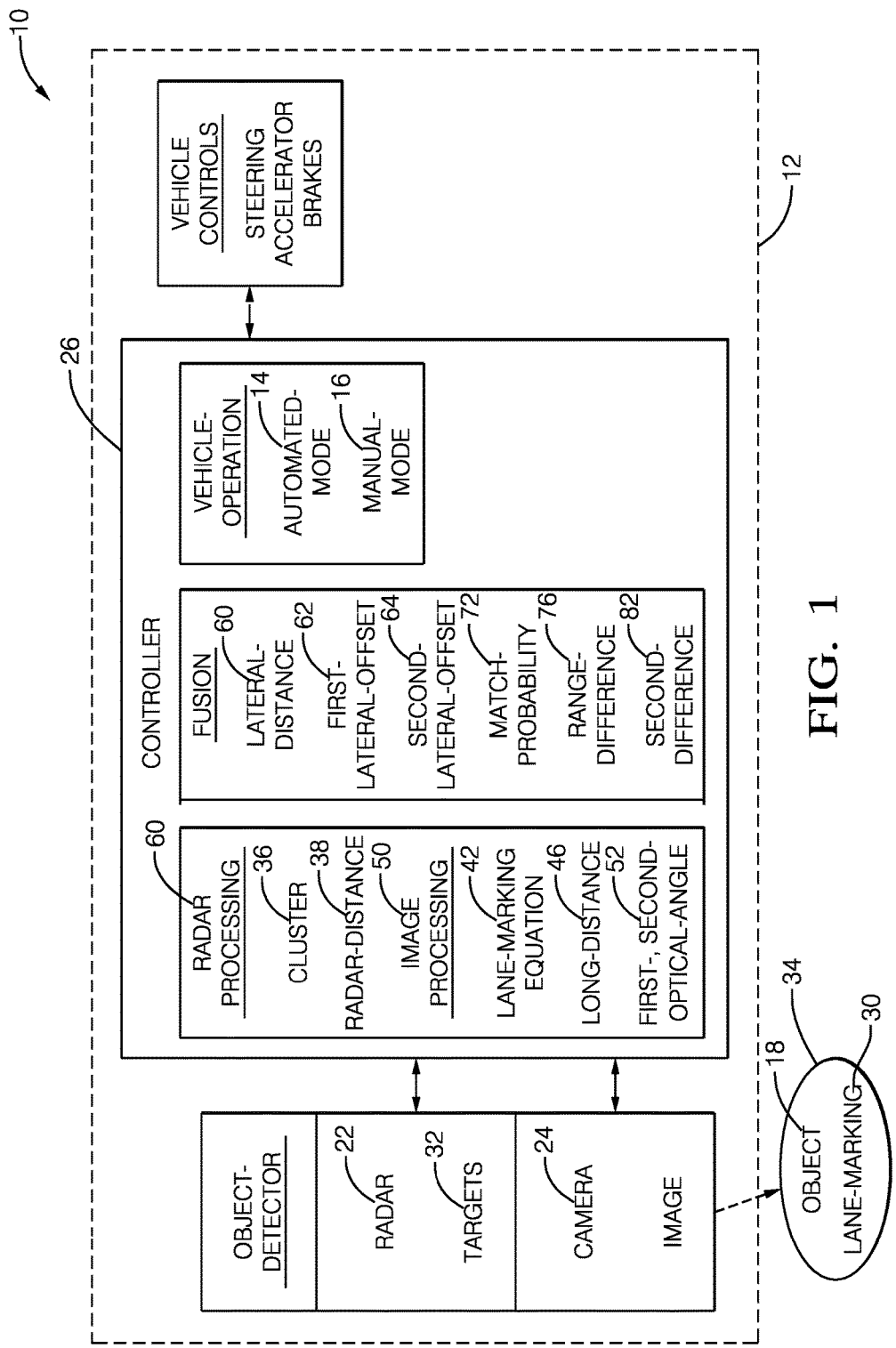
FIG. 1 is a diagram of an object detection system in accordance with one embodiment.

FIG. 1 illustrates a non-limiting example of an object detection system 10, hereafter referred to as the system 10. In general, the system 10 is for use by an automated vehicle, for example a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object 18 such as an other-vehicle 20 (FIGS. 2 and 3) located forward of the host-vehicle 12. Various degrees of partial automation are also contemplated such as, but not limited to, automated lane keeping assistance and/or automated speed control with forward vehicle distance keeping.

The system 10 includes a radar 22, a camera 24, and a controller 26 in communication with the radar 22 and the camera 24. The communication may be by way of wires, optical-fiber, or wireless communication as will be recognized by those in the art. While the radar 22 and the camera 24 are shown as being part of an object-detector, this is not a requirement. That is, the radar 22 and the camera 24 may be co-located in a single housing, or they may be located at separate locations on the host-vehicle 12. The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining the position or location of the other-vehicle 20 relative to the host-vehicle 12 based on signals received by the controller 26 from the radar 22 and the camera 24 as described herein.

Figure 2:
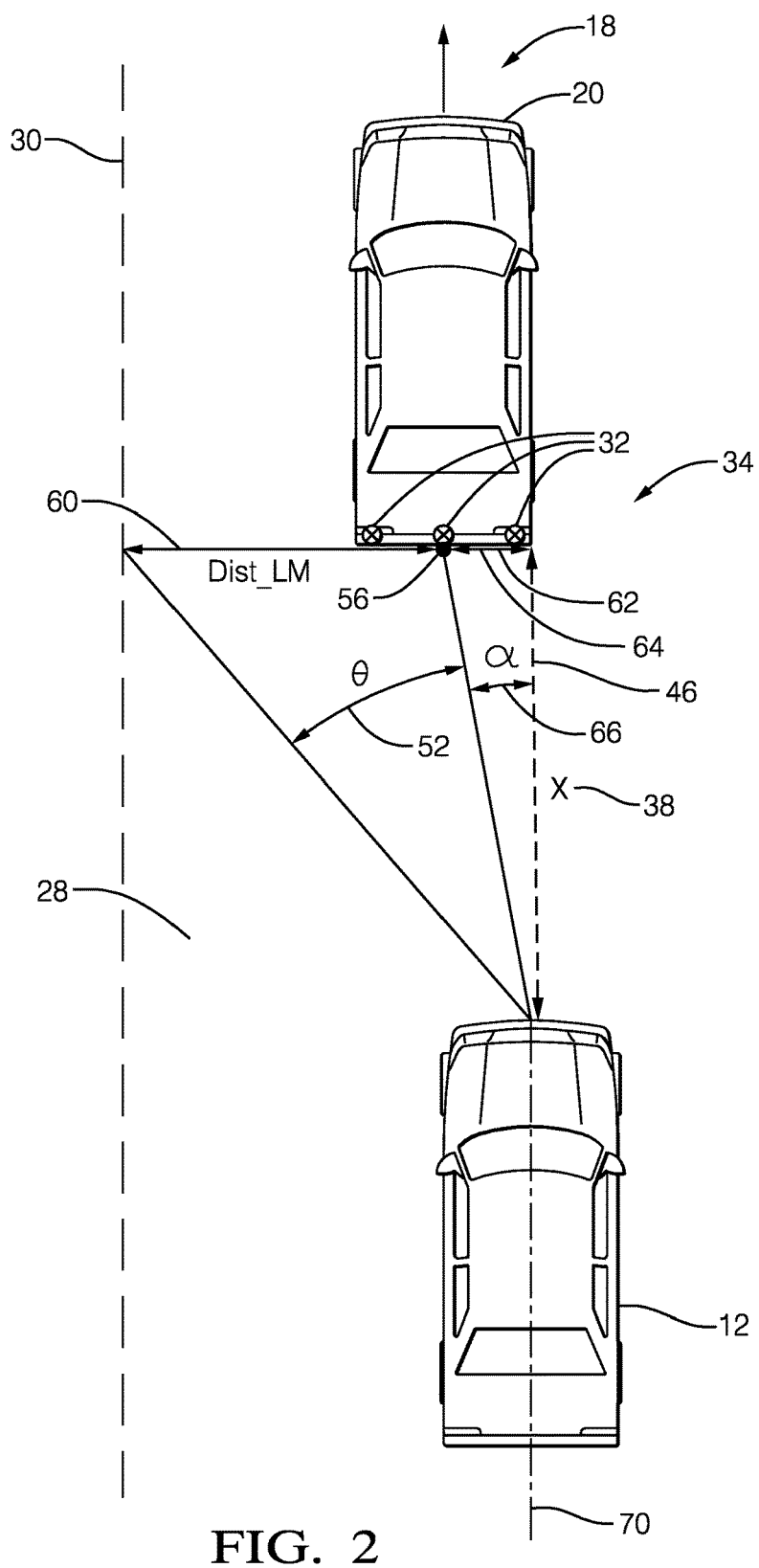
FIG. 2 is a top view of measurements made by the system of FIG. 1 in accordance with one embodiment.
Figure 3:
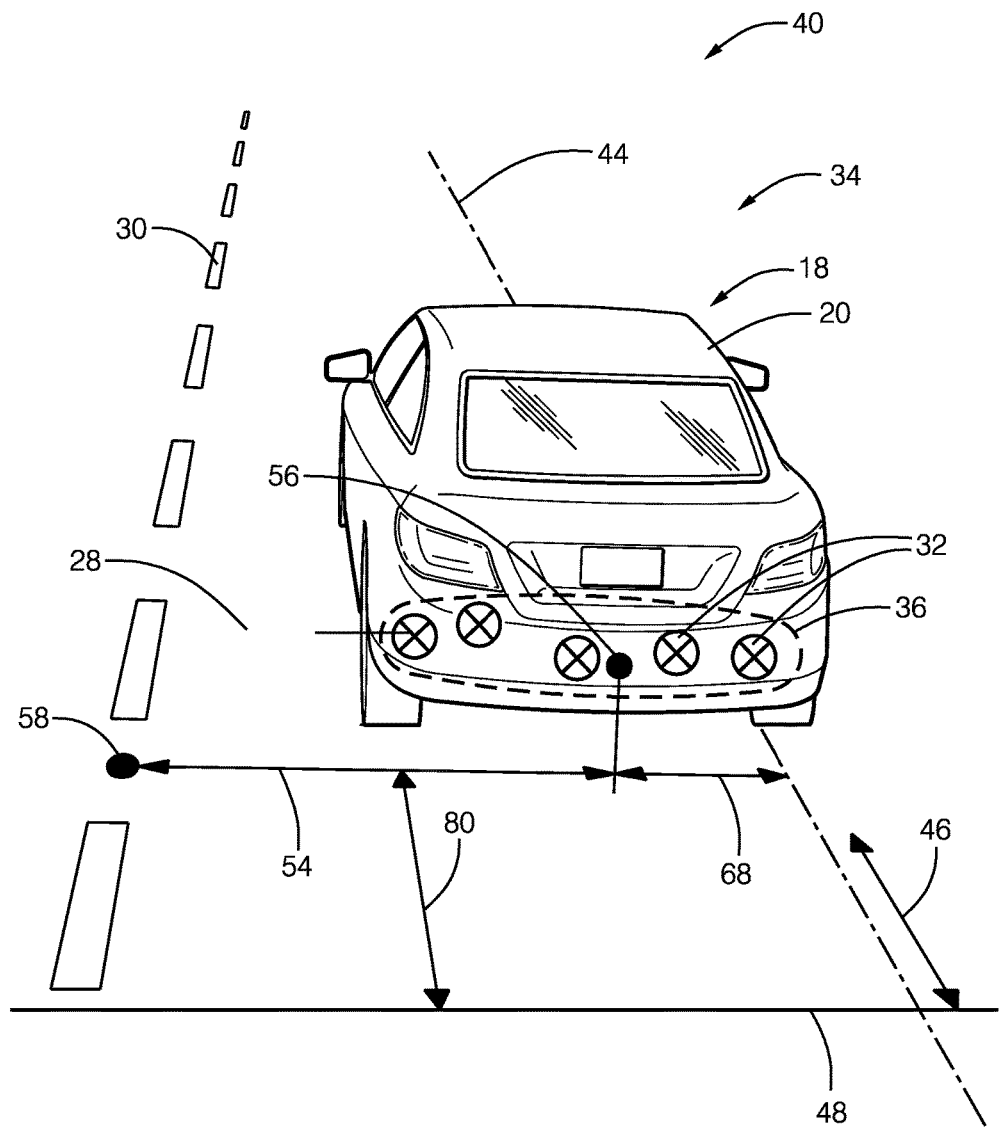
FIG. 3 is an illustration of an image from a camera of the system of FIG. 1 in accordance with one embodiment.

FIGS. 2 and 3 illustrate a non-limiting example of the host-vehicle 12 and the other-vehicle 20 traveling on a roadway 28 that is delineated by a lane-marking 30 located to the left of the host-vehicle 12. While the lane-marking 30 is shown as being straight, the advantages of the system 10 described herein when the lane-marking 30 is curved will become apparent. While the lane-marking 30 is illustrated as only being to the left of the host-vehicle 12 and the other-vehicle 20, this is only to simplify the illustration and explanation. The system 10 works equally well when the detected lane-marking is to the right of the host-vehicle 12, and when lane-markings are located both left and right of the host-vehicle 12.

The radar 22 is used to detect instances of targets 32, i.e. individual radar-reflections, in an area 34 proximate to a host-vehicle 12. When an object 18 such as the other-vehicle 20 reflects a radar-signal from the radar 22, radar-processing 60 (FIG. 1) in the controller 26 may classify one or more of the targets 32 as being associated with a cluster 36 of targets. Which of the targets 32 that are associated with a particular instance of the cluster 36 is generally determined by the targets 32 that form the cluster 36 having similar range and/or range-rate values indicated by the radar 22. The cluster 36 may be characterized by a radar-distance 38 (x)

from the host-vehicle 12, which may be determined based on the average or other mathematical sorting of the ranges to each of the targets 32 associated with the cluster 36, as will be recognized by those in the art. The cluster 36 may also be characterized by a radar-range-rate (not shown) relative to the host-vehicle 12, which may be determined based on the average or other mathematical sorting of the range-rates to each of the targets 32 associated with the cluster 36.

FIG. 3 illustrates a non-limiting example of an image 40 rendered by the camera 24. In this example, the image 40 includes an instance of an object 18 that is the other-vehicle 20 traveling forward of the host-vehicle 12 (not shown in FIG. 3). The image 40 also includes the lane-marking 30 which was previously introduced as being present in the area 34.

In a fusion tracker system, matching algorithms are needed to fuse together object information coming from a vision system (the camera 24) with object information coming from the radar sensors (the radar 22). Each type of sensor has its own strengths and weaknesses. A vision system will excel in providing centroid azimuth angles and object classification, but will often provide inaccurate longitudinal object position. A radar system will provide good range and range rate information, but oftentimes relatively poor azimuth angles. In the absence of uncertainty information from the sensor systems, it is a challenge to design a matching algorithm that will reliably match up vision and radar measurements related to the same object. But achieving accurate matching between sensor measurements is critical for active safety systems. For example, poor matching results may cause further away vision objects to be matched with closer radar tracks, causing false objects to appear in host path that may lead to erroneous braking maneuvers. Presently, known matching algorithms calculate probabilities that a vision object should be matched with a radar object. These probabilities rely on a number of factors including similarities in motion status, azimuth angle, longitudinal position, and longitudinal velocity between a vision track and a radar track. Once a match is made and a radar-vision fused track is initiated, the lateral position of the track is primarily determined from the azimuth angle given by the matched vision track.

The system 10 described herein presents a new technique for solving the shortcomings of previous approaches for matching information from different sensors. The problem of inaccurate matching between vision and radar tracks in a fusion tracker system is solved by utilizing other additional pieces of information coming from the vision system; namely, vision sensed lane-markings and road model. As described in more detail below, the new technique uses vision information that has not previously been used in matching and is not subject to the same scale errors that affect the vision estimation of longitudinal and lateral distance. For example, while the longitudinal position of a vision track is subject to scale errors, the angle from a vision object to a lane-marking is not. By utilizing this extra information from the vision system, results show an improvement in matching vision to radar tracks.

To this end, the controller 26 may be configured to use image processing 50 to determine a lane-marking equation 42, hereafter the equation 42 that corresponds to an offset of the lane-marking 30 in the image 40 relative to a centerline 44 of the image 40. The equation 42 is a function of a longitudinal-distance 46 from the host-vehicle 12. The longitudinal-distance 46 may be measured relative to a baseline 48 of the image 40, which may correspond to a forward edge of the host-vehicle 12, or a hood-line of the host-vehicle 12. The equation 42 may be of any form, but initial testing suggests that a third-order polynomial is sufficiently complex to adequately fit to the curvature of observed instances of the lane-marking 30.

The controller 26 may be further configured to determine a first-optical-angle 52 ($\theta$, FIG. 2) based on a first-image-distance 54 (FIG. 3) on the image 40 between a reference-point 56 on the object 18 (i.e. the other-vehicle 20) and a spot 58 on the image 40 indicated by a first-value of the equation 42 where the longitudinal-distance 46 entered into the equation 42 is equal to the radar-distance 38 (x). That is, the equation 42 is a function of the longitudinal-distance 46 (x) indicated by the radar 22 which is used as the independent variable in the equation 42 to indicate or determine the location of the spot 58 in the image 40 along the lane-marking 30. It is recognized that the actual distance from the host-vehicle 12 to the reference-point 56 on the other-vehicle 20 may not be exactly equal to the longitudinal-distance 46 as illustrated in FIG. 2, but the difference for most situations is considered to be negligible.

The controller 26 may be further configured to determine a lateral-distance 60 (Dist_LM, FIG. 2) between the object (e.g. the reference-point 56 on the other-vehicle 20) and the lane-marking 30 (e.g. the spot 58) based on the first-optical-angle 52 ($\theta$) and the radar-distance 38 (x). The lateral-distance 60 (Dist_LM) is calculated using the trigonometric tangent function where Dist_LM$\approx$x*tan ($\theta$).

The controller 26 may be further configured to determine a first-lateral-offset 62 ($y_{RM}$) between the object and a longitudinal-axis 70 (i.e. the boresight of the object-detector) of the host-vehicle 12 based on the lateral-distance 60 (Dist_LM) and the first-value. The longitudinal-axis 70 corresponds to, or is aligned with, the centerline 44 of the image 40 if the camera 24 is properly aligned on the host-vehicle 12, or the centerline 44 of the image 40 is determined using an image-alignment or image-calibration process, as will be recognized by those in the art.

If the roadway 28 is curved and/or the host-vehicle 12 is not in the center of the travel-lane presently occupied by the host-vehicle 12, a longitudinal-axis 70 of the host-vehicle 12 may not align with the center of the travel-lane of the host-vehicle 12 at the location of the other-vehicle 20. In this situation it may be advantageous to include the relative position of the host-vehicle 12 relative to the lane-marking at the host-vehicle 12. That is, the controller 26 may be further configured to determine the first-lateral-offset 62 ($y_{RM}$) based on a second-value of the equation 42 at the host-vehicle 12 where the longitudinal-distance 46 is equal to zero.

The first-lateral-offset 62 ($y_{RM}$) is useful to an object detection system for an automated vehicle as it can be determined when an object such as the other-vehicle 20 is in the same travel-lane as the host-vehicle 12, and/or if the other-vehicle 20 is changing lanes, i.e. is moving out of or into the travel-lane of the host-vehicle 12. The advantage of the above described method to determine the first-lateral-offset 62 of the other-vehicle 20 relative to the host-vehicle 12 is particularly advantageous when the roadway 28 and associated instances of the lane-marking 30 are curved as the method described herein does not introduce errors when the boresight of the object-detector (e.g. the center-line of the image 40 from the camera 24 and the zero azimuth angle of the radar 22) is not parallel to the lane-marking 30 at the other-vehicle 20, i.e. at the spot 58.

Accordingly, the system 10 may be further configured to operate the host-vehicle 12 using the vehicle-controls (steering, accelerator, brakes) based on the first-lateral-offset 62

($y_{RM}$). For example, if the other-vehicle 20 changes lanes into a lane adjacent to the present travel-lane of the host-vehicle 12, the system 10 may increase the speed of the host-vehicle 12. Prior systems that do not properly associate lateral movement of the other-vehicle 20 with curvature of the roadway 28 may mistakenly interpret that lateral movement as a lane-change and accelerate when in fact the other-vehicle 20 continues to travel in the travel-lane of the host-vehicle 12.

The controller 26 may be further configured to determine a second-optical-angle 66 ($\alpha$, FIG. 2) based on a second-image-distance 68 (FIG. 3) on the image 40 between the reference-point 56 on the object 18 and a centerline 44 of the image 40, and then determine a second-lateral-offset 64 (y*) between the object 18 (e.g. the reference-point 56 on the other-vehicle 20) and the longitudinal-axis 70 based on the second-optical-angle 66 (a) and the radar-distance 38 (x). It is recognized that the second-lateral-offset 64 (y*) may be a less than optimal indication of lateral-position and lateral-movement of the other-vehicle 20 when the roadway 28 is curved. However, the second-lateral-offset 64 (y*) can be useful as a secondary sense check of the first-lateral-offset 62 ($y_{RM}$) as will be described in more detail below. It also follows that the system 10 may be further configured to operate the host-vehicle based on the first-lateral-offset 62 ($y_{RM}$) and the second-lateral-offset 64 (y*).

The controller 26 may be further configured to determine a match-probability 72 based on an offset-difference (not shown) between the first-lateral-offset 62 ($y_{RM}$) and the second-lateral-offset 64 (y*). If the offset-distance is relatively low, less than ten centimeters (10 cm) for example, then the match-probability will be relatively high, greater than 0.8 on a scale of zero to one, so there is high confidence that the actual location of the other-vehicle 20 relative to the host-vehicle 12 is known. It is contemplated that other measurements could be used to determine the match-probability. For example, the match-probability 72 may be further determined based on a range-difference 76 between the radar-distance 38 (x) and an optical-distance indicated by a height 80 of the object 18 in the image 40. If the radar-distance 38 (x) and the height 80 are closely matched, where what is closely matched would be determined by empirical testing, then the match-probability would be relatively high. As another non-limiting example, the match-probability 72 may be further determined based on a rate-difference 82 between a range-rate of the object 18 indicated by the radar 22, the determination of which is known, and an optical-rate indicated by a change-in-height of the object between the image 40 and a prior-image (not shown).

Accordingly, an object detection system for an automated vehicle (the system 10), a controller 26 for the system 10, and a method of operating the system 10 is provided. The system 10 described herein is advantageous over prior systems because it better tracks the lateral position of an other-vehicle traveling forward of the host-vehicle when the roadway curves.

While this invention has been described in terms of the preferred embodiments thereof, it is not intended to be so limited, but rather only to the extent set forth in the claims that follow.

We claim:

1. An object detection system for an automated vehicle, said system comprising:
    a radar that detects targets in an area proximate to a host-vehicle, wherein a cluster of targets is characterized by a radar-distance (x) from the host-vehicle;
    a camera that renders an image of an object and a lane-marking present in the area; and
    a controller in communication with the radar and the camera, said controller configured to determine an equation that is a function of a longitudinal-distance from the host-vehicle and corresponds to the lane-marking in the image,
    determine a first-optical-angle ($\theta$) based on a first-image-distance on the image between a reference-point on the object and a spot on the image indicated by a first-value of the equation where the longitudinal-distance is equal to the radar-distance,
    determine a lateral-distance (Dist_LM) between the object and the lane-marking based on the first-optical-angle and the radar-distance,
    determine a first-lateral-offset (yRM) between the object and a longitudinal-axis of the host-vehicle based on the lateral-distance and the first value, and
    operate the host-vehicle in accordance with the lateral-distance and the first-lateral-offset.

2. The system in accordance with claim 1, wherein the controller is further configured to determine the first-lateral-offset based on a second-value of the equation at the host-vehicle where the longitudinal-distance is equal to zero.

3. The system in accordance with claim 1, wherein the system is further configured to operate the host-vehicle based on the first-lateral-offset.

4. The system in accordance with claim 1, wherein the controller is further configured to
    determine a second-optical-angle (a) based on a second-image-distance on the image between the reference-point on the object and a centerline of the image, wherein the centerline is selected to correspond to the longitudinal-axis, and
    determine a second-lateral-offset (y*) between the object and the longitudinal-axis based on the second-optical-angle and the radar-distance.

5. The system in accordance with claim 4, wherein the system is further configured to operate the host-vehicle based on the first-lateral-offset and the second-lateral-offset.

6. The system in accordance with claim 4, wherein the controller is further configured to determine a match-probability based on an offset-difference between the first-lateral-offset and the second-lateral-offset.

7. The system in accordance with claim 6, wherein the match-probability is further determined based on a range-difference between the radar-distance and an optical-distance indicated by a height of the object in the image.

8. The system in accordance with claim 7, wherein the match-probability is further determined based on a rate-difference between a range-rate of the object indicated by the radar and an optical-rate indicated by a change-in-height of the object between the image and a prior-image.

* * * * *